US009226140B2

(12) United States Patent
Johansson et al.

(10) Patent No.: US 9,226,140 B2
(45) Date of Patent: Dec. 29, 2015

(54) SECURITY FEATURE NEGOTIATION BETWEEN NETWORK AND USER TERMINAL

(75) Inventors: Thomas Johansson, Åby (SE); Håkan Englund, Lund (SE); Mats Näslund, Bromma (SE)

(73) Assignee: Unwired Planet, LLC, Reno, NV (US)

( * ) Notice: Subject to any disclaimer, the term of this patent is extended or adjusted under 35 U.S.C. 154(b) by 773 days.

(21) Appl. No.: 13/498,154

(22) PCT Filed: Sep. 28, 2009

(86) PCT No.: PCT/SE2009/051073
§ 371 (c)(1),
(2), (4) Date: Mar. 26, 2012

(87) PCT Pub. No.: WO2011/037504
PCT Pub. Date: Mar. 31, 2011

(65) Prior Publication Data
US 2012/0190343 A1  Jul. 26, 2012

(51) Int. Cl.
*H04M 1/66* (2006.01)
*H04W 12/02* (2009.01)
*H04W 12/04* (2009.01)
*H04W 12/12* (2009.01)

(52) U.S. Cl.
CPC .............. *H04W 12/02* (2013.01); *H04W 12/04* (2013.01); *H04W 12/12* (2013.01)

(58) Field of Classification Search
USPC .................................................. 455/411, 410
See application file for complete search history.

(56) References Cited

U.S. PATENT DOCUMENTS

| 2003/0092445 A1* | 5/2003 | Timonen et al. ............. 455/439 |
| 2004/0029576 A1* | 2/2004 | Flykt et al. ................. 455/422.1 |
| 2005/0047597 A1* | 3/2005 | Zheng ........................... 380/247 |
| 2008/0046719 A1 | 2/2008 | Kim et al. |
| 2008/0205650 A1* | 8/2008 | Forsberg ...................... 380/272 |
| 2010/0020746 A1 | 1/2010 | Zaks |

(Continued)

FOREIGN PATENT DOCUMENTS

| EP | 1770581 A1 | 4/2007 |
| WO | 01/26409 | 4/2001 |
| WO | 02/45453 A1 | 6/2002 |

OTHER PUBLICATIONS

Author Unknown. "Feature Dependencies Evaluation." 3GPP TSG SA WG3 Security—SA3#38, S3-050222, Geneve, Switzerland, Apr. 26-29, 2005.

(Continued)

*Primary Examiner* — Justin Lee
(74) *Attorney, Agent, or Firm* — Nixon & Vanderhye P.C.

(57) ABSTRACT

A Mobile Station (MS), a Base Station System (BSS) and a Mobile Switching Center (MSC) of a cellular network, such as GSM, are disclosed. According to one embodiment, the MS is arranged to carry out one or more security features in its communication with the network. For example, the MS may be arranged to: • by means of information received in a signalling message (0) from the network, discover if the network supports one or more of said security features, • exchange information with the network in order to enable the use of one or more of the above-mentioned supported security features in the communication, • carry out at least one of the one or more of the supported security features in the communication with the network.

14 Claims, 7 Drawing Sheets

(56) References Cited

U.S. PATENT DOCUMENTS

2010/0191965 A1\* 7/2010 Fischer et al. ............... 713/168
2011/0045799 A1\* 2/2011 Cofta ............................ 455/411

OTHER PUBLICATIONS

Bais, A. et al. "Evaluation of UMTS Security Architecture and Services." IEEE International Conference on Industrial Informatics, Singapore, Aug. 16-18, 2006.

European Search Report dated Nov. 28, 2014 in EP09849886.8, 3 pages.

3rd Generation Partnership Project; Technical Specification Group Services and System Aspects; 3G Security; Security architecture (Release 12) 3GPP TS 33.102 V12.2.0, Dec. 2014, 76 pages.

3rd Generation Partnership Project; Technical Specification Group Services and System Aspects; 3G Security; Security architecture (Release 1999) 3GPP TS 33.102 V3.13.0 Dec. 2002, 63 pages.

3rd Generation Partnership Project; Technical Specification Group Services and System Aspects; 3GPP System Architecture Evolution (SAE): Security Architecture; (Release 8) 3GPP TS 33.401 V8.3.0, Mar. 2009, 61 pages.

\* cited by examiner

SECURITY FEATURE NEGOTIATION BETWEEN NETWORK AND USER TERMINAL

This application is the U.S. national phase of International Application No. PCT/SE2009/051073, filed Sep. 28, 2009, which designated the U.S.

TECHNICAL FIELD

The present invention discloses an improved user terminal and an improved controlling node for a cellular network.

BACKGROUND

In cellular networks such as, for example, GSM (Global System for Mobile communications) networks, some security features such as the choice of ciphering algorithm in the communication between user terminals and the network are negotiated between the user terminal and the network, depending on the capabilities of the particular terminal and the network.

There is a natural desire to increase the security of the negotiation procedure between a user terminal and the network in order to prevent potential attackers from "hijacking" the negotiation and ordering the user terminal to use a less than optimal ciphering algorithm. A scenario in which an attacker "tricks" the terminal and the network into using less than optimal security is known as a "bidding-down attack", and is often very difficult to protect against. Increased security should not come at too high a cost, i.e. involving large changes to the communication flows between terminal and network.

One reason that bidding-down attacks in connection with the negotiation procedure are difficult to handle is that it should be possible to use an enhanced security during the negotiation, whilst at the same time keeping the ability to use older user terminals in the network, i.e. user terminals which might not be equipped with the ability to use the enhanced security. Conversely, newer terminals, supporting negotiation which has been security-enhanced by means of, for example, ciphering or encryption, should be able to interoperate with older networks that do not support security enhanced negotiation.

SUMMARY

A purpose of the present invention is to address, singly or in combination, the desires described above. Accordingly, it would for example be desirable to increase the security of the negotiation procedure between a user terminal and the network, whilst making it possible to use older terminals in the network.

This purpose can be achieved by the invention in that it discloses a controlling node for a cellular network, the controlling node being arranged to carry out one or more security features in its communication with the one or more user terminals, the controlling node also being arranged to:
 signal, in a message to the one or more user terminals that the controlling node supports at least one of said security features,
 exchange information with at least one user terminal regarding one or more of said security features.
 carry out at least one of the one or more of the supported security features in the communication with the network.

Thus, by means of the invention, user terminals which support the security features which are also supported by the controlling node will, by means of the signalling message, detect the security features which are in use in the network, and will thus be able to use them. User terminals which do not support the security features in question will, depending on the kind of user terminal and the network, either simply disregard the signalling message or will not start to exchange said information with the controlling node.

In one embodiment, the controlling node is arranged to transmit the signalling message as a network initiated broadcast message.

In another embodiment, the controlling node is arranged to transmit the signalling message as a consequence of a request message from a user terminal for the use of one or more of said security features, with the signalling being sent as an addressed message to the requesting user terminal.

Suitably, in the controlling node, the security features comprise at least two ciphering capabilities for use in the communication with the network and a procedure for secure selection of one of these ciphering capabilities together with at least one user terminal. The information which is exchanged with the at least one user terminal in order to initiate the use of one or more security features comprises:
 information that ensures that the network has correct information regarding the user terminal's ciphering capabilities,
 information from the network regarding which, if any, of said ciphering capabilities that the network wishes to use.

In one aspect of the invention, the controlling node is also arranged to transmit information to the one or more user terminals regarding a set of controlling nodes in the network which are capable of using said one or more security features.

Suitably, the controlling node of some embodiments of the invention is arranged to exchange information with a user terminal to ensure that the network has correct information regarding the user terminal's security capabilities by e.g. receiving the user terminal's ciphering capabilities from the user terminal, and returning a checksum based on these capabilities. In such an embodiment, the controlling node is preferably arranged to calculate the checksum.

The various embodiments of the invention can be applied in a variety of different cellular networks, so the controlling node of the various embodiments of the invention can either, for example, be a BSS, Base Station System, in a GSM network in which case the higher node mentioned would be an MSC, Mobil Switching Centre, in a GSM network.

In addition to the controlling node, the invention also discloses a user terminal for a cellular network, the user terminal being arranged to carry out one or more security features in its communication with the network, and to:
 by means of information received in a signalling message from the network, discover if the network supports one or more of said security features,
 exchange information with the network in order to enable the use of one or more of said supported security features in the communication,
 carry out at least one of the one or more of the supported security features in the communication with the network.

Thus, the user terminal can interact with the controlling node of the various embodiments of the invention in order to discover security features which are supported, and to use those features.

In one embodiment, the user terminal is arranged to receive the signalling message as a network initiated unsolicited broadcast message.

In another embodiment, the user terminal is arranged to receive the signalling message as an addressed message to the user terminal as a consequence of a request message which the user terminal has transmitted to the network for the use of one or more of said security features.

In one embodiment, the user terminal is arranged to transmit said request message to the network a predefined number of times or during a first predefined period of time, or at predefined mobility events, if the signalling message is not received from the network during a second predefined period of time.

In another embodiment of the user terminal, the one or more security features comprise at least two ciphering capabilities for use in the communication with the network and a procedure for secure selection of one of said ciphering capabilities together with the network, and the information in the signalling message from the network comprises information indicating the network's ability to carry out the secure selection of ciphering capability, and the information which is exchanged with the network in order to initiate the use of one or more security features comprises:

information that ensures that the network has correct information regarding the user terminal's ciphering capabilities, information from the network regarding which, if any, of said ciphering capabilities that the network wishes to use.

In another embodiment, the user terminal is additionally arranged to receive information from the network regarding a set of controlling nodes in the network which are capable of using at least one of said one or more security features, and the user terminal is arranged to reject a move to a controlling node in this set which does not use one of these security features.

In one embodiment, the user terminal is arranged to exchange information with the network to ensure that the network has correct information regarding the user terminal's security capabilities by transmitting its ciphering capabilities to the network, calculating a first checksum based on its ciphering capabilities, and to receive a second checksum from the network, the user terminal also being arranged to perform a predefined action if the first and second checksums are not equal. In one such embodiment of the user terminal this predefined action is one of the following:

Transmit an error message to the network,

Refrain from replying to the network.

Also, in one such embodiment, the user terminal is arranged to interpret the second checksum to also confirm which ciphering capability that should be used.

In one embodiment, the user terminal is arranged to generate a second authentication key for use when receiving information from the network regarding the choice of ciphering capability, this second authentication key being derived from a first key which is known to the user terminal and to the network.

In one embodiment, the user terminal is arranged to use the second authentication key in the calculation of said first checksum.

Since the various embodiments of the invention are applicable in a number of cellular networks, the user terminal of the embodiments of the invention can be of various kinds, but in one embodiment, it is an Mobile Station, MS, for a GSM network.

These and other embodiments as well as advantages gained by means of the invention will be described in more detail in the following sections.

BRIEF DESCRIPTION OF THE DRAWINGS

Embodiments of the invention will be described in more detail in the following, with reference to the appended drawings, in which.

DETAILED DESCRIPTION

Figure 1:
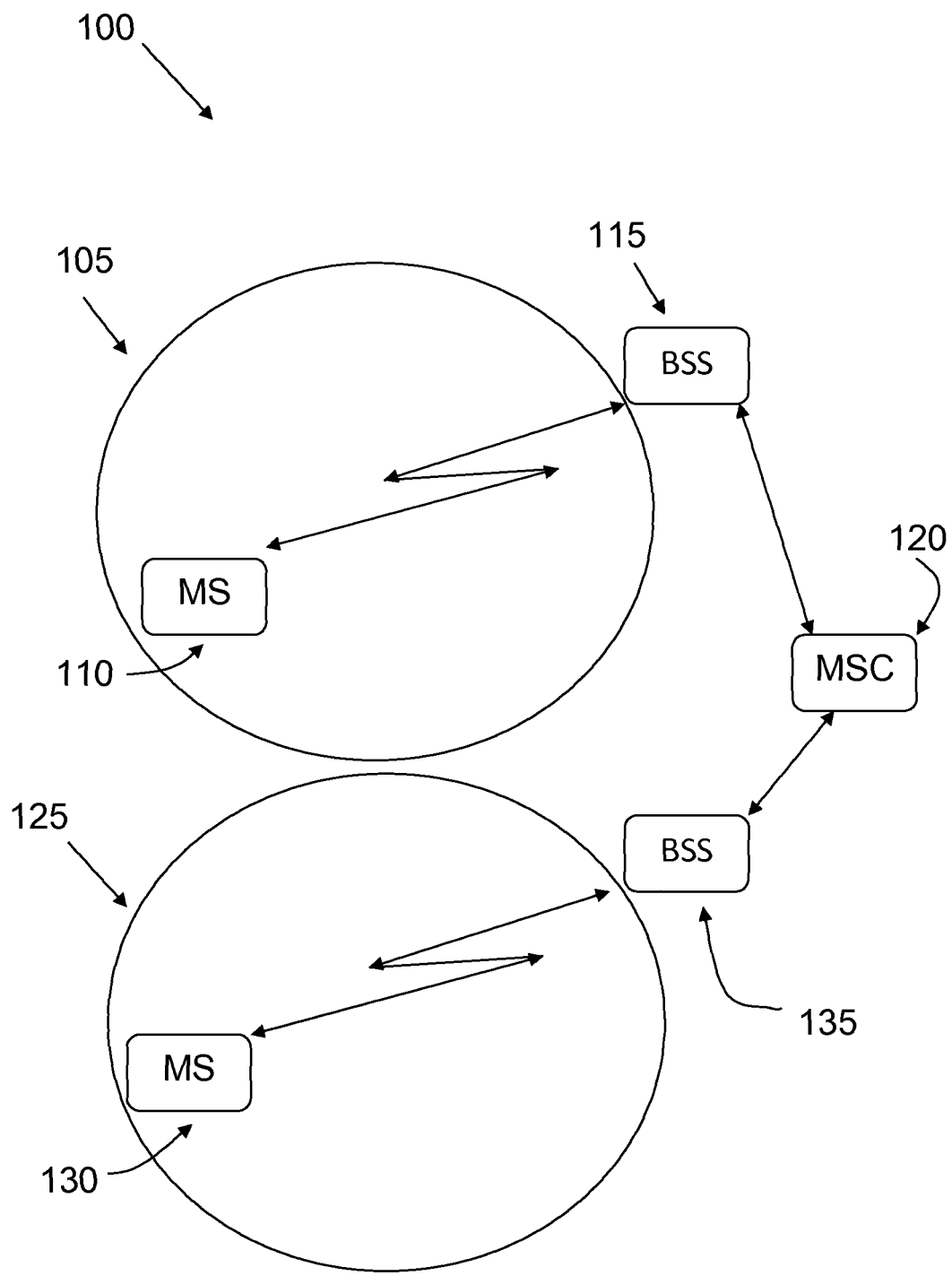
FIG. 1 shows a schematic view of a network in which the present invention can be applied.

FIG. 1 shows a schematic view of a cellular network 100 in which embodiments of the invention can be applied. The network 100, as well as the embodiments of the invention in general in the following, will be described using terminology borrowed from the GSM standard, so that the network in which the embodiments of the invention are applied will be described as a GSM network. However, it should be pointed out that this is merely an example used in order to facilitate the reader's understanding of the various embodiments of the invention; the principles of the embodiments of the invention can also be applied in other cellular networks, such as, for example, WCDMA (Wideband Code Division Multiple Access), and LTE (Long Term Evolution) networks.

Returning now to FIG. 1, there is shown a cellular network 100, in which there is comprised at least a first 105 and a second 125 cell. Each cell can accommodate a number of users having user terminals, so called Mobile Stations, MS; one MS 110, 130, is shown in each cell as an example.

For each cell there is also a controlling node, in GSM known as a BSS, Base Station System. The BSS may comprise a BSC, Base Station Controller and at least one RBS, Radio Base Station. All traffic to and from an MS in a cell can be routed via the BSS of the cell.

As shown in FIG. 1, the network 100 also comprises at least one so called MSC 120, Mobile Switching Centre, which serves one or more BSS. The roles of the BSS and the MSC in the network will not be described in detail here, since they are well known to those skilled in the field.

In the communication between an MS and its BSS, various security features can be used in order to prevent unauthorized access to the traffic, one such security feature being the use a ciphering algorithm which is usually chosen from among one or more ciphering algorithms. The choice of security or ciphering algorithm is negotiated between the MS and the network, via the MSC, a negotiation which usually takes place when a session is set up between the MS and the network.

By means of the various embodiments of the invention, a more secure negotiation can be obtained, whilst still making it possible for an MS which does not support the various embodiments of the invention to perform a negotiation of the kind which it does support. Such a secure negotiation will be descried using a principle which will also be referred to here as "Secure Algorithm Selection".

One principle behind the various embodiments of the invention is to let the BSS transmit a signalling message indicating to the MSs that the BSS, and thus the network, supports the "Secure Algorithm Selection". According to some embodiments of the invention, the signalling message in question is either sent as a broadcast in the cell of the BSS, or the message is sent by the BSS as an addressed message to a certain MS, in the latter case to an MS which has sent a query message to the BSS regarding whether or the network supports the "Secure Algorithm Selection".

Also according to the various embodiments of the invention, when the "Secure Algorithm Selection" is active in the network, i.e. supported by the network, an MS which also supports this principle will transmit its (the MS's) ciphering capabilities to the network, i.e. in this case to the BSS. According to some embodiments of the invention, the MS also calculates a first checksum based on the MS's ciphering capabilities and the network calculates a second checksum based on the received MS ciphering capabilities, and transmits its checksum to the MS. The MS then compares the two checksums, and if they are the same, the MS will conclude that the network has correctly understood the ciphering capabilities of the MS.

The checksum which is calculated in the network can be calculated either in the BSS, in the MSC, or by the BSS in cooperation with the MSC.

Regarding the ciphering capabilities supported by the MS (and thus naturally also by the network), these capabilities can of course vary both between different kinds of networks, such as e.g. GSM and WCDMA, and also within one and the same network, but taking a GSM network as an example, ciphering capabilities which are supported by the MSs can be exemplified by the principles known as A5/1, A5/3 and A5/4. In fact, non-ciphering related security capabilities, e.g. data integrity capabilities, key management capabilities etc can also be handled by some embodiments of the invention within the framework of the security features of the various embodiments of the invention.

Returning now to the GSM example, in one embodiment of the invention the BSS also indicates to the MS which neighbouring cells (i.e. the BSS and/or the MSC of those cells) that support the same security features as the present cell (BSS and/or MSC), such features being for example, the ciphering capabilities. By means of this information, an MS will know which security features to expect in a new cell, and can reject a move (e.g. "hand over") to a cell which does not support those features, since such a cell may be a fake cell, i.e. an attempt to "hijack" the MS.

Also, in one embodiment of the invention, the MS and the network (BSS and/or MSC) generate an authentication key to be used when the network transmits information or instructions to the MS regarding the choice of ciphering capability or principle. Suitably, this key is derived from a first key which is known to or agreed upon between the MS and the network. In GSM, as an example, the first key can be the ciphering key known as Kc which is produced during user authentication. From Kc, a second key, here referred to as Kc', is derived using a predefined or agreed upon principle. Preferably, a cryptographic one-way function is used to this end. The key Kc' of some of the embodiments of the invention will also from now on be referred to as the second key.

Suitably, an MS of the embodiments of the invention is arranged to also use the second authentication key in the calculation of the first checksum.

Figure 2:
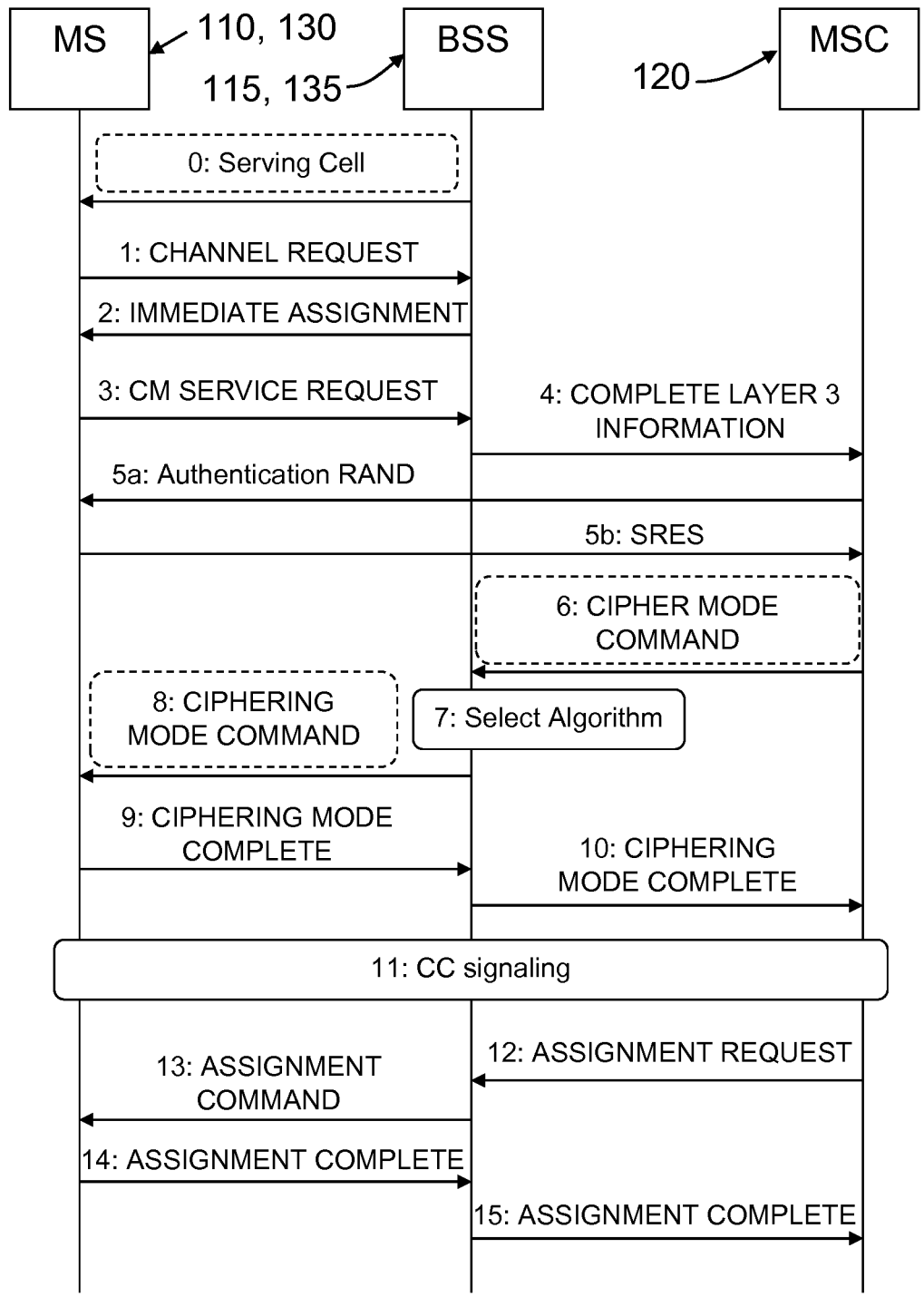
FIGS. 2 and 3 show signalling diagrams of some embodiments of the invention.

FIG. 2 shows a signalling diagram of one embodiment of the invention in a network in which the embodiment of the invention is used. The nodes between which the signalling is shown are the MS, the BSS and the MSC. Messages which are added by the invention, and existing messages which are affected by the invention have been given a dashed frame around their number, for the sake of clarity.

The messages which are exchanged are as follows, with the numbers below corresponding to the numbers shown in FIG. 2:

0: The BSS broadcasts to the MSs in a cell that the "Secure Algorithm Selection" is supported in this cell. This information can be transmitted in a broadcast message of its own, but is suitably added as information in an existing broadcast message, such as the message Serving Cell Information.

1: An MS sends the message CHANNEL REQUEST to the BSS.

2: The BSS responds with the message IMMEDIATE ASSIGNMENT

3: The MS sends the message CM SERVICE REQUEST. This message comprises information on the MS's ciphering capabilities.

4: The BSS transmits the message COMPLETE LAYER 3 INFORMATION to the MSC.

5a: The network sends the message Authentication RAND from the MSC to the MS via the BSS. At this stage, the MSC and MS may generate the key Kc'.

5b: The MS responds with the message SRES to the MSC via the BSS.

6: The MSC transmits the message CIPHER MODE COMMAND to the BSS. This message now comprises a checksum based on the list of the MS's ciphering capabilities, suitably protected with the key Kc'. Thus, this message can also be seen as comprising a MAC based on (Kc', MS_capabilities), where MAC stands for Message Authentication Code.

7: The BSS selects the ciphering algorithm to be used, based on the capabilities received from the MS.

8: The BSS transmits the message CIPHERING MODE COMMAND to the MS, thereby instructing the MS as to which ciphering algorithm to use. The message also comprises the previously mentioned (7 above) MAC based on (Kc', MS_capabilities). If the checksum is not the same as the one generated by the MS itself, the MS can be arranged to take different actions, such as, for example, transmitting an error message to the network, or to refrain from replying to the network.

9: The MS transmits the message CIPHERING MODE COMPLETE to the BSS.

10: The BSS forwards the message CIPHERING MODE COMPLETE to the MSC.

11: CC (call control) signaling.

12: ASSIGNMENT REQUEST from the MSC to the BSS.

13: ASSIGNMENT COMMAND from the BSS to the MS.

14: ASSIGNMENT COMPLETE from the MS to the BSS.

15: ASSIGNMENT COMPLETE from the BSS to the MSC.

Figure 3:
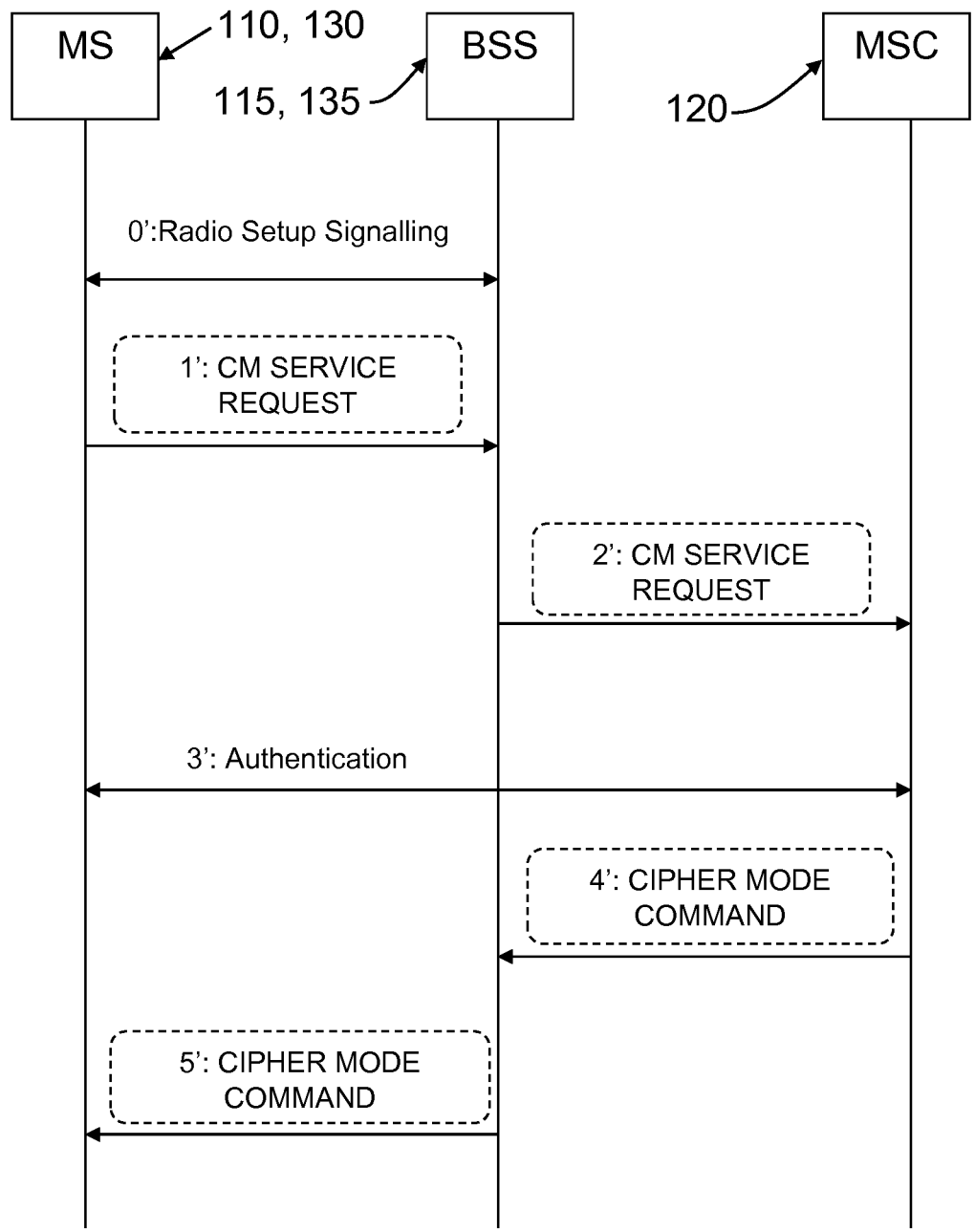

FIG. 3 shows a signalling diagram of another embodiment of the invention in a network in which the invention is used. As in FIG. 2, the nodes between which the signalling is shown are the MS, the BSS and the MSC. Messages which are added by the invention and existing messages which are affected by the invention have been given a dashed frame around their number, for the sake of clarity.

In a practical use case, note that the MS will typically more or less simultaneously receive broadcast messages from a plurality of RBS:s in the BSS. This makes the task of attacking the security of the system much more difficult since an attacker would need to continuously suppress all broadcasts. Presence of such radio jamming would be easy to detect.

It can be noted that the MAC is suitably calculated as a function of Kc', MS_capabilities and also the selected algorithm. In this case, the checksum cannot be computed by the MSC but must be computed by the BSS since the MSC does not know which algorithm the BSS will select, In this case, the MSC therefore also transmits the Kc' key to the BSS.

The messages and activities indicated in FIG. 3 are the following:

0': The MS and the BSS perform Radio Setup Signalling, as defined in the network, for example GSM.

1': The MS transmits the message CM SERVICE REQUEST to the BSS comprising a list (MS_capabilities) of the ciphering capabilities of the MS, as well as a request for the use of the feature Secure Algorithm Selection according to the present invention.

2': The BSS forwards the message CM SERVICE REQUEST to the MSC, which checks the message to see if it comprises a request for the feature Secure Algorithm Selection.

3': The MS and the network (BSS and MSC) perform Authentication, including generating a first key, and, if Secure Algorithm Selection is active, also generates the key Kc' and determines the MAC based on Kc' and MS_capabilities.

4': The MSC transmits the message CIPHER MODE COMMAND to the BSS, including the MAC based on Kc' and MS_capabilities. The BSS selects a ciphering algorithm based on the MS's capabilities.

5': The BSS transmits the message CIPHER MODE COMMAND to the MS, comprising the selected algorithm and the MAC based on Kc' and MS_capabilities. The MS, upon receipt of this message, checks if there is an MAC field in the message, and if this is the case, verifies that the MAC is correct and stores the fact that the network supports the feature Secure Algorithm Selection of the present invention. If the MAC is not correct, the MS can take the actions listed in connection with FIG. 2.

It can be noted that the MAC is suitably calculated as a function of Kc', MS_capabilities and also the selected algorithm. In this case, the checksum cannot be computed by the MSC but must be computed by the BSS as discussed above, Note that since the MS actively requests the use of secure ciphering selection, this will complicate the task for a potential attacker. Even if the attacker might succeed on occasion to perform a bidding-down attack, the MS will still request the feature on the next attachment to the network, thus essentially forcing an attacker to continuously track the user throughout the network.

Figure 4:
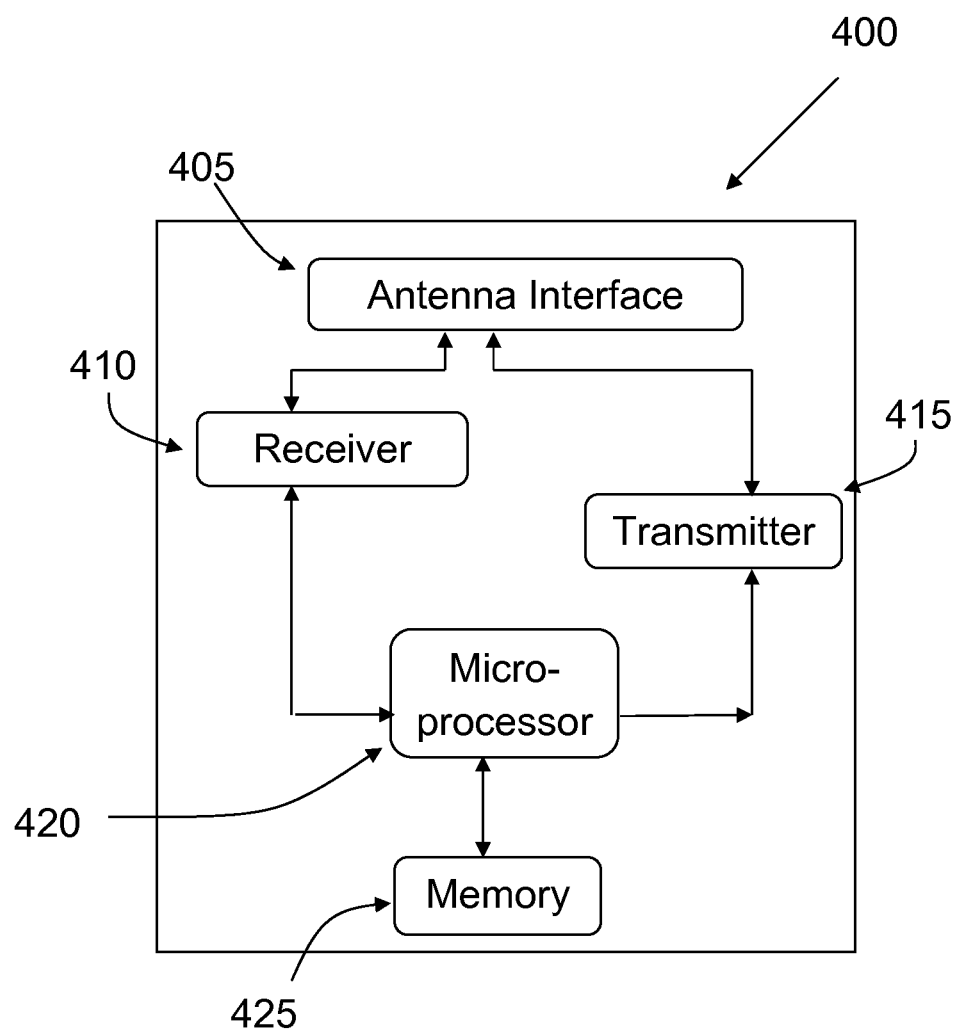
FIG. 4 shows a schematic diagram of a user terminal according to an embodiment of the invention.

FIG. 4 shows a schematic block diagram of an embodiment of a MS (or user terminal or user equipment) 400 of the invention. The MS 400 is arranged to function in a cellular network, such as the network in FIG. 1, and is equipped with the following components:

An antenna, 405, which is both a transmit and a receive antenna,

A receive unit 410,

A transmit unit 415,

A control unit 420, such as, for example, a microprocessor, for controlling the function of the MS 400 and the function of the individual components in the MS 400, A memory unit 425, for storing, for example, executable code for a processor, as well as temporary parameters which are used during the operation of the MS.

The antenna 405 is used by the MS 400 both in transmissions to and from the network. The receive unit 410 is used in receiving the transmissions from the network, i.e. the BSS (or the MSC via the BSS), which have been described above. The transmit unit 415 is used by the MS 400 in making the transmissions to the network i.e. the BSS (or the MSC via the BSS) which have been described above.

The control unit 420 is used for the control of the MS 400, and for making comparisons, establishing parameters, generating keys, and carrying out ciphering as described above, in cooperation with the memory unit 425 which may store executable code needed by the control unit 420, as well as parameters needed during the operation of the MS 400.

Depending on the network in which the present invention is applied, the MS 400 of the various embodiments of the invention can suitably be an MS for a GSM network, or a user equipment in a WCDMA or LTE network.

Figure 5:
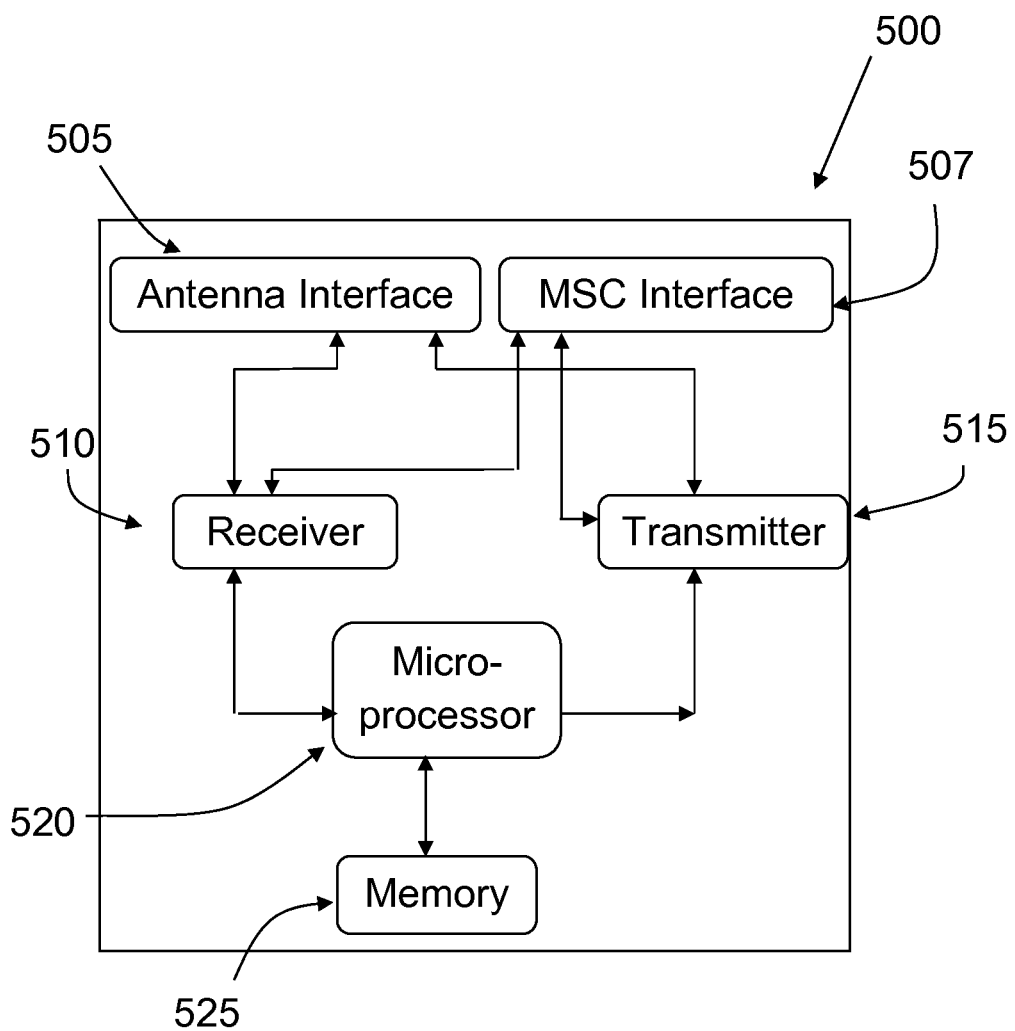
FIG. 5 shows a schematic diagram of a controlling node according to an embodiment of the invention.

FIG. 5 shows a schematic block diagram of a controlling node 500 according to an embodiment of the invention. The controlling node 500 is arranged to function in a cellular network which is arranged according to an embodiment of the invention, such as the network 100 in FIG. 1, and is equipped with the following components:

An antenna interface 505, which is an interface to both a transmit and a receive antenna, An interface 507 to a higher node in the network, such as an MSC, usually a landline interface, A receive unit 510, A transmit unit 515, A control unit 520, such as, for example, a microprocessor, for controlling the function of the controlling node 500 and the function of the individual components in the controlling node 500, A memory unit 525, for storing, for example, executable code for a processor, as well as temporary parameters which are used during the operation of the MS.

The antenna which the controlling node 505 interfaces to via the interface 505 is used by the controlling node 500 both in transmissions to and from MSs in the network. The receive unit 510 is used in receiving the transmissions from the MSs in the network, as has been described above. The transmit unit 515 is used by the controlling unit 500 in making the transmissions to the MSs in the network, as has been described above.

The control unit 520 is used for the control of the controlling node 500, and for establishing parameters, generating keys, and carrying out ciphering as described above, in cooperation with the memory unit 525 which may store executable code needed by the control unit 520, as well as parameters needed during the operation of the controlling node 500.

Figure 6:
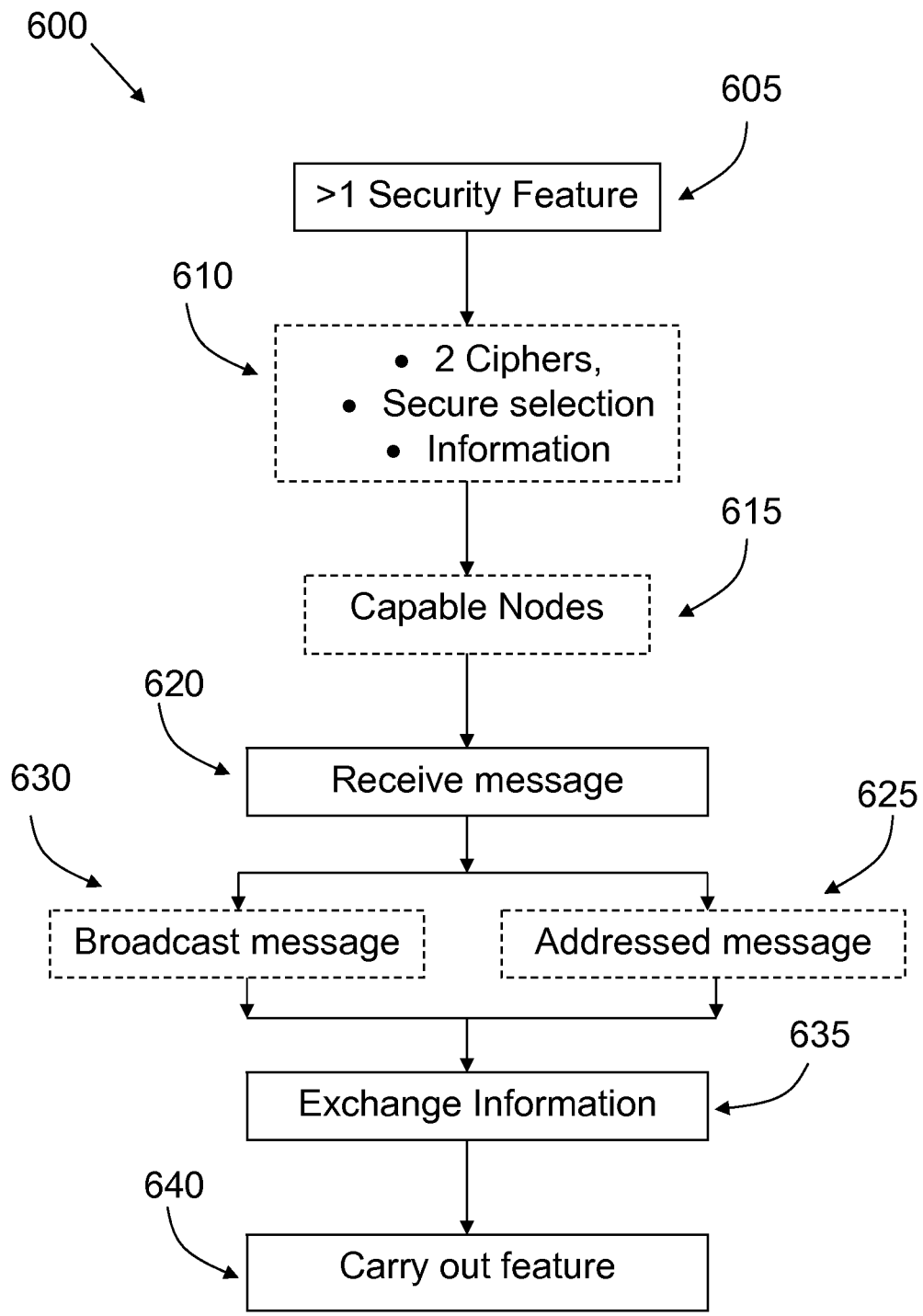
FIG. 6 shows a flow chart of a method according to an embodiment of the invention, and FIG. 7 also shows a flow chart of a method according to an embodiment of the invention.

The invention also discloses a method for use in a user terminal in a cellular network. A schematic flow chart 600 of this method is shown in FIG. 6. Steps which are options or alternatives are indicated with dashed lines.

As indicated in step 605 in FIG. 6, the inventive method for use in a user terminal for a cellular network comprises letting the user terminal carry out one or more security features in its communication with the network. The method comprises:

letting the user terminal discover if the network supports one or more of said security features, by means of information received in a signalling message from the network, as indicated in step 620, letting the user terminal exchange information with the network in order to enable the use of one or more of said supported security features in the communication, as indicated in step 635, letting the user terminal carry out at least one of the one or more of the supported security features in the communication with the network, as indicated in step 640.

As indicated in step 630, in one embodiment of the invention, the signalling message is received as a network initiated broadcast message. As indicated in step 635, in another embodiment of the invention, the signalling message is received as an addressed message to the user terminal as a consequence of a request message which the user terminal transmits to the network for the use of one or more of the security features. In one such embodiment of the method of the invention, the user terminal transmits the request message to the network a predefined number of times or during a first predefined period of time, or at predefined mobility events, if said signalling message is not received from the network during a second predefined period of time. The mobility events referred to above are, for example, signalling procedures that takes place between the terminal and the network due to movements of the terminal. Examples include inter-cell hand-over (the terminal redirects its traffic from one RBS to another) and/or Location Area (LA) Update (the terminal moves from a BSS served by one MSC to a BSS served by another MSC), In the latter case, the terminal can also move while being "idle"; i.e. LA Update can occur while the terminal has no ongoing communication session. These GSM procedures have equivalent or similar procedures in other networks such as WCDMA and LTE.

By repeatedly requesting the use of the security feature as the MS moves in the network, further security enhancement is obtained for reasons as previously discussed, namely that an attacker would need to intervene, not only when the MS attaches to the network, but also each time the MS moves in the network.

As indicated in step 610, the one or more security features suitably comprise at least two ciphering capabilities for use in the communication with the network and a procedure for secure selection of one of said ciphering capabilities together with the network, and the information in the signalling message from the network comprises information indicating the network's ability to carry out said secure selection of ciphering capability, and said information which is exchanged with the network in order to initiate the use of one or more security features comprises:

information that ensures that the network has correct information regarding the user terminal's ciphering capabilities,
  information from the network regarding which, if any, of said ciphering capabilities that the network wishes to use.

As indicated in step 615, in one embodiment, the user terminal additionally receives information from the network regarding a set of controlling nodes in the network which are capable of using at least one of said one or more security features, and according to this embodiment, the user terminal rejects a move to a controlling node in said set which does not use one of said security features.

In one embodiment of the method, indicated in step 635, the user terminal exchanges information with the network to ensure that the network has correct information regarding the user terminal's security capabilities by transmitting its ciphering capabilities to the network, calculating a first checksum based on its ciphering capabilities and by receiving a second checksum from the network, according to which method the user terminal performs a predefined action if the first and second checksums are not equal.

Suitably, the predefined action is one of the following:
  Transmit an error message to the network,
  Refrain from replying to the network.

In one embodiment of the invention, the second checksum is interpreted to also confirm which ciphering capability that should be used.

In one embodiment of the invention, the user terminal generates a second authentication key for use when receiving information from the network regarding the choice of ciphering capability, with the second authentication key being derived from a first key which is known to the user terminal and to the network. Suitably, the second authentication key is used by the user terminal in the calculation of said first checksum.

Note that the embodiments of FIGS. 2 and 3 can be used together. That is, the network broadcasts that it supports the security feature, and the terminal also requests the use of the feature if it has not received any broadcasts from the network indicating support. This means that if an attacker, despite the difficulty, manages to suppress broadcasts from the network, the terminal will still request the use of the security feature, making the tasks of an attacker even more difficult.

In one embodiment, the method is applied in an MS, a Mobile Station, for a GSM network.

Figure 7:
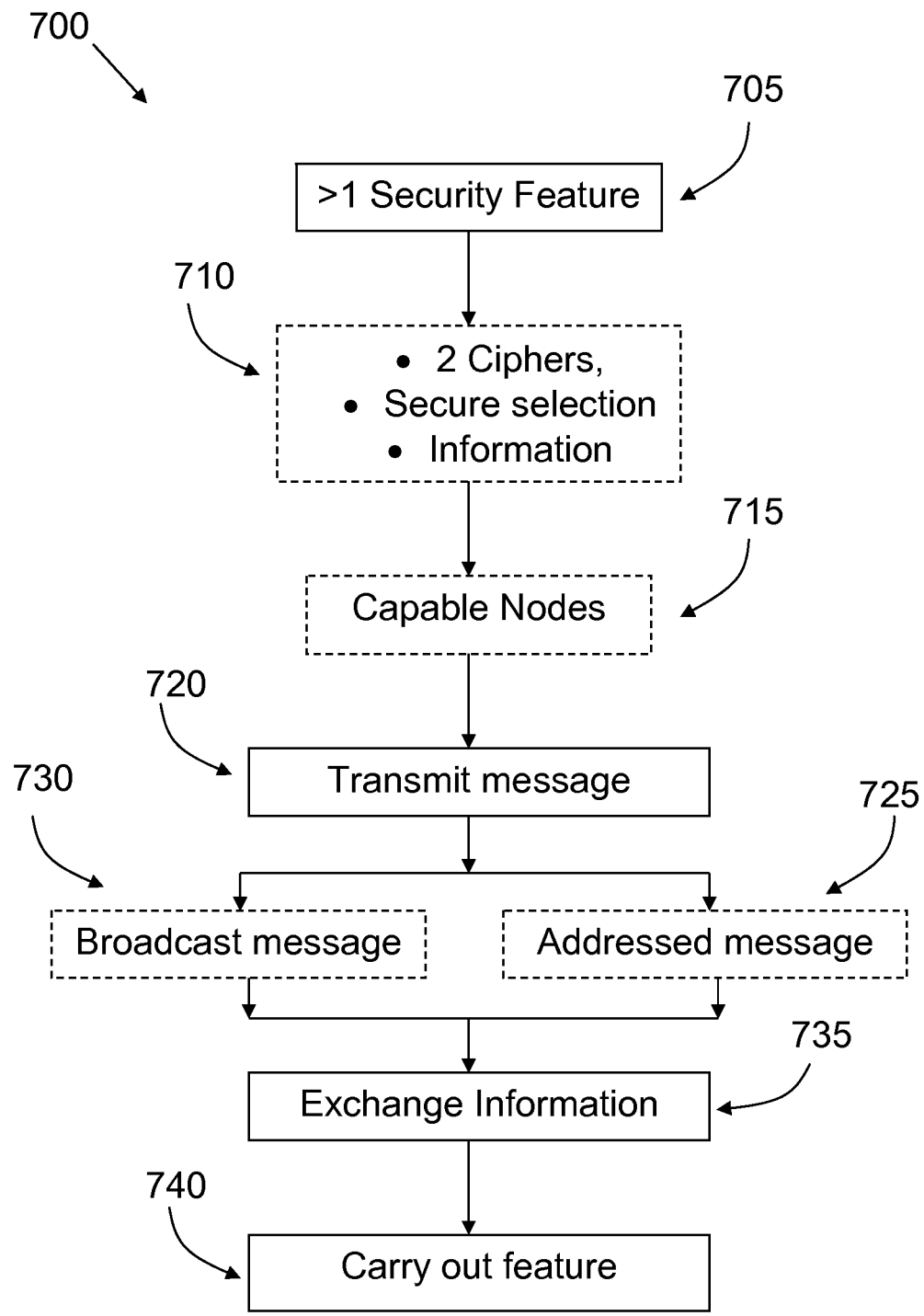

The invention also discloses a method for use in a controlling node in a cellular network. A schematic flow chart 700 of this method is shown in FIG. 7. Steps which are options or alternatives are indicated with dashed lines.

The inventive method for use in a controlling node for a cellular network comprises letting the controlling node carry out one or more security features, as indicated in step 705 in its communication with one or more user terminals in the cellular network. The method 700 comprises letting the controlling node:

signal, in a message to the one or more user terminals that the controlling node supports at least one of said security features, as indicated in step 720,
  exchange information with at least one user terminal regarding one or more of said security features, as indicated in step 735,
  carry out at least one of the one or more of the supported security features in the communication with the network as indicated in step 740.

As indicated in step 730, in one embodiment, the message is transmitted (sent) as a network initiated broadcast message.

As indicated in step 735, in one embodiment, the message is transmitted as a consequence of a request message from a user terminal for the use of one or more of said security features, and the message is sent as an addressed message to the requesting user terminal.

As indicated in step 710, the security features comprise at least two ciphering capabilities for use in the communication with the network and a procedure for secure selection of one of said ciphering capabilities together with at least one user terminal, and the information which is exchanged with the at least one user terminal in order to initiate the use of one or more security features comprises:

information that ensures that the network has correct information regarding the user terminal's ciphering capabilities,
  information from the network regarding which, if any, of said ciphering capabilities that the network wishes to use.

As indicated in step 715, in one embodiment, the method additionally comprises the transmission of information to the one or more user terminals regarding a set of controlling nodes in the network which are capable of using the one or more security features.

In one embodiment, the exchange of information with a user terminal to ensure that the network has correct information regarding the user terminal's security capabilities comprises receiving the user terminal's ciphering capabilities from the user terminal, and returning a checksum based on these capabilities. In one such embodiment, the checksum is calculated in the controlling node.

Suitably, the method denoted 700 is applied to a BSS in a GSM network, with the higher node being an MSC in the same GSM network.

The invention is not limited to the examples of embodiments described above and shown in the drawings, but may be freely varied within the scope of the appended claims. For example, the man skilled in the field will realize that the principle of the invention which has been described above using the security feature "Secure Algorithm Selection" as an example can be applied to a wide variety of security features, such as any technical means or process for ensuring a systems' security with respect to one or more of the properties confidentiality, integrity, non-repudiation, authentication, user privacy, or accountability.

The invention claimed is:

1. A user terminal for a cellular network, the user terminal being arranged to carry out one or more security features in its communication with the network, wherein said user terminal is configured to:
   based at least in part on information received in a signaling message from the network, discover whether the network supports one or more of said security features, wherein the one or more of said security features comprise at least two ciphering capabilities for use in the communication with the network and a procedure for secure selection of one of said ciphering capabilities together with the network, and the information in the signaling message from the network comprises information indicating the network's ability to carry out said secure selection of ciphering capabilities;
   exchange information with the network in order to enable the use of one or more of said supported security features in the communication and to ensure that the network has correct information regarding the user terminal's security capabilities, wherein the exchange comprises:
      sending a message to the network, the message comprising information regarding the user terminal's ciphering capabilities; and
      receiving a message from the network, the message comprising:
         information instructing the user terminal which, if any, of said ciphering capabilities the network wishes to use; and
         a first checksum, based on information received by the network regarding the user terminal's ciphering capabilities;
   calculate a second checksum based on the user terminal's ciphering capabilities and perform a predefined action if the first and the second checksums are not equal; and
   carry out at least one of the one or more of the supported security features in the communication with the network.

2. The user terminal of claim 1, wherein said user terminal is further configured to receive said signaling message as an addressed message to the user terminal, as a consequence of a request message which the user terminal has transmitted to the network for the use of one or more of said security features.

3. The user terminal of claim 1, wherein said user terminal is further configured to receive said signaling message as a network initiated unsolicited broadcast message.

4. The user terminal of claim 1, wherein said user terminal is further configured to generate a second authentication key for use when receiving information from the network regarding the choice of ciphering capability, said second authentication key being derived from a first key which is known to the user terminal and to the network.

5. A controlling node for a cellular network, wherein said controlling node is configured to:
   carry out one or more security features in its communication with one or more user terminals;
   signal, in a signaling message to the one or more user terminals that the controlling node supports at least one of said one or more security features, wherein the one or more security features comprise at least two ciphering capabilities for use in the communication with the network and a procedure for secure selection of one of said ciphering capabilities together with at least one user terminal;
   exchange information with at least one user terminal regarding one or more of said security features and to ensure that the network has correct information regarding the user terminal's security capabilities, wherein the exchanging comprises:
      receiving a message from the at least one user terminal, the message comprising information regarding the at least one user terminal's ciphering capabilities; and
      sending a message to the at least one user terminal, the message comprising:
         information instructing the at least one user terminal which, if any, of said ciphering capabilities the network wishes to use; and
         first checksum, based on information received by the network regarding the at least one user terminal's ciphering capabilities,
         wherein said sending the message to the at least one user terminal enables the at least one user terminal to perform a predefined action if the first checksum is not equal to a second checksum calculated by the at least one user terminal based on the at least one user terminal's ciphering capabilities; and
   carry out at least one of the one or more of the supported security features in the communication with the network.

6. The controlling node of claim 5, wherein said controlling node is further configured to transmit said signaling message as a consequence of a request message from a user terminal for the use of one or more of said security features, said message being sent as an addressed message to the requesting user terminal.

7. The controlling node of claim 5, wherein said controlling node is further configured to transmit said signaling message as a network initiated unsolicited broadcast message.

8. The controlling node of claim 5, wherein said controlling node is further configured to transmit information to the one or more user terminals regarding a set of controlling nodes in the network which are capable of using said one or more security features.

9. A method for use in a user terminal for a cellular network, the method comprising:
   carrying out one or more security features in its communication with the network;
   discovering whether the network supports one or more of said security features, based at least in part on information received in a signaling message from the network, wherein said one or more security features comprise at least two ciphering capabilities for use in the communication with the network and a procedure for secure selection of one of said ciphering capabilities together with the network, and the information in the signaling message from the network comprises information indicating the network's ability to carry out said secure selection of ciphering capability;

exchanging information with the network in order to enable the use of one or more of said supported security features in the communication and ensure that the network has correct information regarding the user terminal's security capabilities, wherein the exchanging comprises:
- sending a message to the network, the message comprising information regarding the user terminal's ciphering capabilities; and
- receiving a message from the network, the message comprising:
  - information instructing the user terminal which, if any, of said ciphering capabilities the network wishes to use; and
  - first checksum, based on information received by the network regarding the user terminal's ciphering capabilities;
- calculate a second checksum based on the user terminal's ciphering capabilities and perform a predefined action if the first and second checksums are not equal; and
- carrying out at least one of the one or more of the supported security features in the communication with the network.

10. The method of claim 9, wherein the user terminal transmits a request message to the network for the use of one or more of said security features, and said signaling message is received as an addressed message to the user terminal as a consequence of the request message.

11. The method of claim 10, wherein the user terminal transmits said request message to the network a predefined number of times or during a first predefined period of time, or at predefined mobility events, if said signaling message is not received from the network during a second predefined period of time.

12. The method of claim 9, wherein the user terminal receives said signaling message as a network initiated unsolicited broadcast message.

13. A method for use in a controlling node for a cellular network, the method comprising:
- carrying out one or more security features in its communication with one or more user terminals in the cellular network;
- signaling, in a signaling message to the one or more user terminals that the controlling node supports at least one of said one or more security features, wherein the one or more security features comprise at least two ciphering capabilities for use in the communication with the network and a procedure for secure selection of one of said ciphering capabilities together with at least one user terminal;
- exchanging information with at least one user terminal regarding one or more of said security features and to ensure that the network has correct information regarding the user terminal's security capabilities, wherein the exchanging comprises:
  - receiving a message from the at least one user terminal, the message comprising information regarding the at least one user terminal's ciphering capabilities; and
  - sending a message to the at least one user terminal, the message comprising:
    - information instructing the at least one user terminal which, if any, of said ciphering capabilities the network wishes to use; and
    - first checksum, based on information received by the network regarding the at least one user terminal's ciphering capabilities,
  - wherein said sending the message to the at least one user terminal enables the at least one user terminal to perform a predefined action if the first checksum is not equal to a second checksum calculated by the at least one user terminal based on the at least one user terminal's ciphering capabilities; and
- carrying out at least one of the one or more of the supported security features in the communication with the network.

14. The method of claim 13, wherein which the controlling node transmits said signaling message as a network initiated unsolicited broadcast message.

* * * * *